United States Patent
Zhao et al.

(10) Patent No.: US 12,463,282 B2
(45) Date of Patent: *Nov. 4, 2025

(54) BATTERY PACK CONTAINING A ROTATABLE CONNECTOR

(71) Applicant: TECHTRONIC CORDLESS GP, Anderson, SC (US)

(72) Inventors: Jiang Zhao, Guangdong (CN); Ya Bin Liu, Guangdong (CN); Jian Guo Zhao, Guangdong (CN); Yuan Bai Wu, Guangdong (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/964,440

(22) PCT Filed: Feb. 12, 2018

(86) PCT No.: PCT/CN2018/076521
§ 371 (c)(1),
(2) Date: Jul. 23, 2020

(87) PCT Pub. No.: WO2019/153349
PCT Pub. Date: Aug. 15, 2019

(65) Prior Publication Data
US 2021/0050565 A1    Feb. 18, 2021

(51) Int. Cl.
*H01M 10/058* (2010.01)
*H01M 50/172* (2021.01)
(Continued)

(52) U.S. Cl.
CPC ....... *H01M 50/267* (2021.01); *H01M 50/172* (2021.01); *H01M 50/204* (2021.01);
(Continued)

(58) Field of Classification Search
CPC .. H01M 50/172; H01M 50/267; H01M 50/20; H01M 50/502; H01M 50/572; Y02E 60/10
(Continued)

(56) References Cited

U.S. PATENT DOCUMENTS 5,308,715 A    5/1994    Aronne
5,358,062 A    10/1994   Uhl et al.
(Continued)

FOREIGN PATENT DOCUMENTS

CN    1568554 A    1/2005
CN    1808741 A    7/2006
(Continued)

OTHER PUBLICATIONS

English language machine translation of "Series-parallel connection switching control device among battery packs" by Wang Fengjin in CN103050740(A) (Year: 2013).*

(Continued)

*Primary Examiner* — Niki Bakhtiari
*Assistant Examiner* — Omar M Kekia
(74) *Attorney, Agent, or Firm* — Dority & Manning, P.A.

(57) ABSTRACT

A battery pack comprising a frame and two or more battery cells installed to the frame. The two or more battery cells are interconnected by a rotatable connector which is configured to enable electrical connections between the two or more battery cells. The rotatable connector is adapted to be switched between at least a first rotational position in which the two or more battery cells being electrically connected, and a second rotational position, in which the two or more battery cells being not electrically connected. When the user actuates the knob on the battery pack, the connecting terminals change their rotational positions from a non-conduct- (Continued)

ing position to a conducting position, thereby enabling the electrical connections between the groups of battery cells.

20 Claims, 10 Drawing Sheets

(51) Int. Cl.
    *H01M 50/204*     (2021.01)
    *H01M 50/267*     (2021.01)
    *H01M 50/284*     (2021.01)
    *H01M 50/296*     (2021.01)
    *H01M 50/503*     (2021.01)
    *H01M 50/509*     (2021.01)

(52) U.S. Cl.
    CPC ....... *H01M 50/284* (2021.01); *H01M 50/296* (2021.01); *H01M 50/503* (2021.01); *H01M 50/509* (2021.01)

(58) Field of Classification Search
    USPC .......................................................... 429/163
    See application file for complete search history.

(56) References Cited

U.S. PATENT DOCUMENTS

| | | | | |
|---|---|---|---|---|
| 5,549,984 | A * | 8/1996 | Dougherty | H02J 7/1423 |
| | | | | 429/93 |
| 8,563,165 | B2 | 10/2013 | Takayama | |
| 2004/0257033 | A1 | 12/2004 | Kubota et al. | |
| 2005/0035737 | A1 * | 2/2005 | Elder | B60L 58/18 |
| | | | | 320/103 |
| 2006/0132090 | A1 * | 6/2006 | Suzuki | H01M 50/572 |
| | | | | 320/112 |
| 2008/0021590 | A1 | 1/2008 | Vanko et al. | |
| 2016/0020443 | A1 | 1/2016 | White et al. | |
| 2016/0126533 | A1 | 5/2016 | Velderman et al. | |
| 2017/0025650 | A1 | 1/2017 | Altenburger et al. | |
| 2018/0040927 | A1 * | 2/2018 | Rejman | H01M 10/482 |
| 2019/0067672 | A1 * | 2/2019 | Park | H01M 10/425 |

FOREIGN PATENT DOCUMENTS

| | | | | |
|---|---|---|---|---|
| CN | 102376924 | A | 3/2012 | |
| CN | 103050740 | * | 4/2013 | ............ Y02E 60/10 |
| CN | 203261085 | U | 10/2013 | |
| CN | 103802075 | A | 5/2014 | |
| CN | 104466045 | A | 3/2015 | |
| CN | 205985178 | U | 2/2017 | |
| CN | 107431158 | A | 12/2017 | |
| CN | 109075299 | A | 12/2018 | |
| CN | 110325028 | A | 10/2019 | |
| JP | H0855616 | A | 2/1996 | |
| JP | 2016051684 | A | 4/2016 | |
| WO | WO2017094983 | A1 | 6/2017 | |
| WO | WO2017143597 | A1 | 8/2017 | |
| WO | WO2018024163 | A1 | 2/2018 | |
| WO | WO2019153349 | A1 | 8/2019 | |

OTHER PUBLICATIONS

International Patent Application No. PCT/CN2018/076521; International Search Report; Aug. 1, 2018; (2 pages).
Search Report from CA OA Corresponding with Application No. 3090555 on Mar, 18, 2022 (1 page).
Chinese Office Action corresponding with Application No. 201880089084.7 on Jun. 29, 2022 (1 page).
European Search Report Corresponding with Application No. EP18905235 on Jul. 8, 2021 (1 page).
Chinese Office Action Corresponding with Application No. 201880098353.6 on Jan. 10, 2023 (1 page).
Chinese Office Action Corresponding with Application No. 201880098353.6 on Nov. 20, 2023 (1 page).
Chinese Office Action Corresponding to Application No. 202080071995 on Nov. 20, 2024.
European Search Report Corresponding to U.S. Appl. No. 17/836,345 on Jul. 9, 2019.
European Search Report Corresponding to U.S. Appl. No. 18/936,977 on Oct. 2, 2024.
K. Amazon: "erenLine Batteriehalter für 3X Mignon AA; geschlossenes Gehäuse mit EIN/Aus-Schalter", Apr. 16, 2016, URL: https://www.amazon.de/Batteriehalter-geschlossenes-Aus-Schalter-Batterie-Fach-Batteriekasten/dp/D01EELZ668 (Unable to access URL).

* cited by examiner

BATTERY PACK CONTAINING A ROTATABLE CONNECTOR

FIELD OF INVENTION

This invention relates to an electrical energy storage device, and in particular a battery pack containing multiple battery cells.

BACKGROUND OF INVENTION

Battery packs are commonly used in portable electrical equipment and tools, so that these equipment and tools can be used in environments where no fixed power supply is available. For example, power tools manufacturers often manufacture a universal power pack which can be compatibly used in different types of cordless power tools, such as electric drills, hammers, screwdrivers, angle grinder, etc. The battery packs usually consist of a plurality of battery cells accommodated in an integral housing where the user can easily install the entire battery into the power tool, or remove it therefrom via latching mechanisms configured on the battery pack housing.

However, traditional battery packs are often manufactured in the factory to a ready-to-use status, which means that the battery pack before leaving the factory for shipping or selling is fully assembled and operational. The end user upon receiving the battery pack may instantly plug the battery pack into an electric device to start using the electric device. The battery packs manufactured in this way no doubt provide convenience to the user as no extra setup step is required on the user's side before starting to use the battery pack. On the other hand, such battery packs suffer from the problem that once it is manufactured in factory, there will be self-discharging of the battery pack, which ultimately leads to energy loss of electrical power n the battery pack, and degrading of battery life.

There have been some types of configurable connectors developed for battery packs which allow the electrical connections between battery cells to be on or off. However, these configurable connectors are often designed as a separate component from the battery pack and they easily run into the risk of being lost, damaged, or otherwise became unavailable for use.

SUMMARY OF INVENTION

In the light of the foregoing background, it is an object of the present invention to provide an alternate battery pack, as well as methods of manufacturing the battery packs and preparing the battery packs for use, which eliminate or at least alleviates the above technical problems.

The above object is met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

Accordingly, the present invention, in one aspect, is a battery pack comprising a frame and two or more battery cells installed to the frame. The two or more battery cells are interconnected by a rotatable connector which is configured to enable electrical connections between the two or more battery cells. The rotatable connector is adapted to be switched between at least a first rotational position in which the two or more battery cells being electrically connected, and a second rotational position, in which the two or more battery cells being not electrically connected.

Preferably, the rotatable connector further contains a user actuated knob, and at least one connecting terminal connected to the knob. The connecting terminal is adapted to pivot as a result of the knob being actuated by a user.

More preferably, the rotatable connector contains a pair of connecting terminals which are formed on two ends of an elongated connecting strip.

According to one specific implementation, the rotatable connector includes a pair of connecting terminals which are formed on two ends of connecting member. The two connecting terminals are arranged such that they are separated from each other at an angle of $\alpha$, wherein $\alpha$ satisfying $0°<\alpha<180°$.

In one variation, $\alpha$ is $90°$.

According to another specific implementation, the two connecting terminals are offset from each other along the axis direction of the knob.

According to a variation of the preferred embodiments, the rotatable connector contains three pairs of connecting terminals. The battery pack further includes four groups of battery cells the electrical connections between which controlled by the three pairs of connecting terminals.

According to another variation of the preferred embodiments, the battery pack further includes a plurality of groups of battery cells. Each said group contains two or more battery cells. The rotatable connector is configured to enable electrical connections between the plurality of groups of battery cells.

Preferably, each group of battery cells contains two sub-groups connected in series, and each sub-group contains a plurality of battery cells connected in parallel.

According to another variation of the preferred embodiments, the battery pack further includes a circuit board to which the rotatable connector is rotatably installed. The circuit board contains one or more duck-billed terminal which is adapted to cooperate with the rotatable connector.

There are many advantages to the present invention. The battery pack according to the present invention is not fully functional when it is manufactured in the factory. Such non-functional status continues during the storing, transporting, selling of the battery pack, and even when the consumer who bought the battery pack together or separately from the electric tool that is intended to be used together with the battery pack stores the battery pack in his premise without unpacking. The time when the battery pack becomes operational is when the user actuates the knob on the battery pack, so that the connecting terminals change their rotational positions from a non-conducting position to a conducting position, thereby enabling the electrical connections between the groups of battery cells. In this way, the internal circuit of the battery pack is completed only when the end user receives the battery pack and put it into the working mode by using the rotatory connector.

A further advantage of the present invention is that the rotary connector provides an easy way for the user to manipulate the electrical connection between the battery cells. No installation of parts is needed, as the rotary connector is an integrated part of the battery pack. The risk of separate parts being lost or damaged is eliminated according to the present invention. In addition, as there is no separate part, there is no need to design any opening or channel on the housing of the battery pack for separate parts to install, and this prevents possible water splash or other types of environmental damage to the internal components of the battery pack.

BRIEF DESCRIPTION OF FIGURES

FIG. 5 is an exploded view of the rotary connector in the battery pack of FIG. 1a.

FIG. 8 is a schematic diagram showing the internal circuit of the battery pack of FIG. 1a.

In the drawings, like numerals indicate like parts throughout the several embodiments described herein.

DETAILED DESCRIPTION OF THE PREFERRED EMBODIMENTS

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

As used herein and in the claims, "couple" or "connect" refers to electrical coupling or connection either directly or indirectly via one or more electrical means unless otherwise stated.

Terms such as "horizontal", "vertical", "upwards", "downwards", "above", "below" and similar terms as used herein are for the purpose of describing the invention in its normal in-use orientation and are not intended to limit the invention to any particular orientation.

Figure 1A:
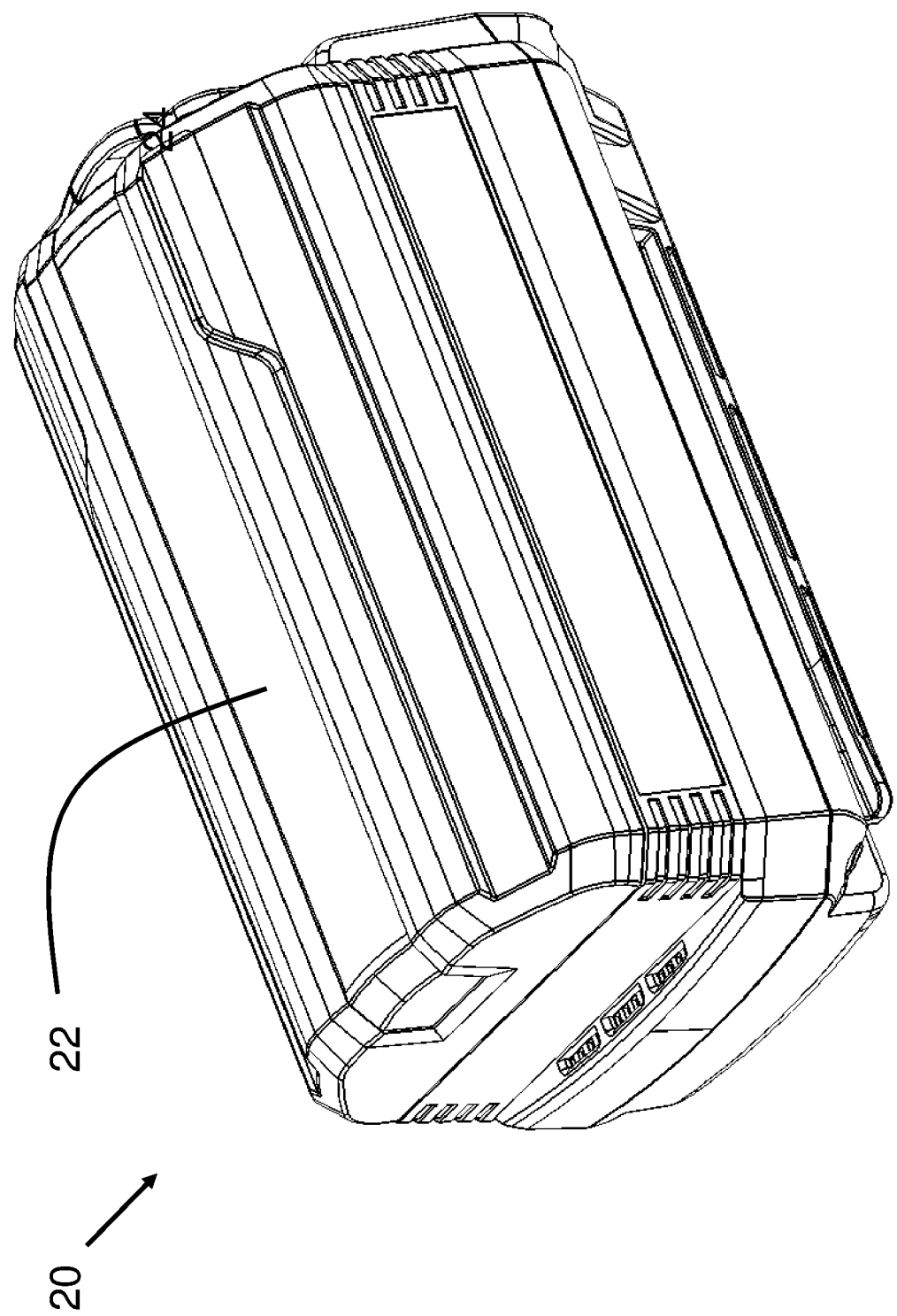
FIG. 1a shows the overall appearance of a battery pack according to a first embodiment of the present invention, where the top side of the battery pack is shown.
Figure 1B:
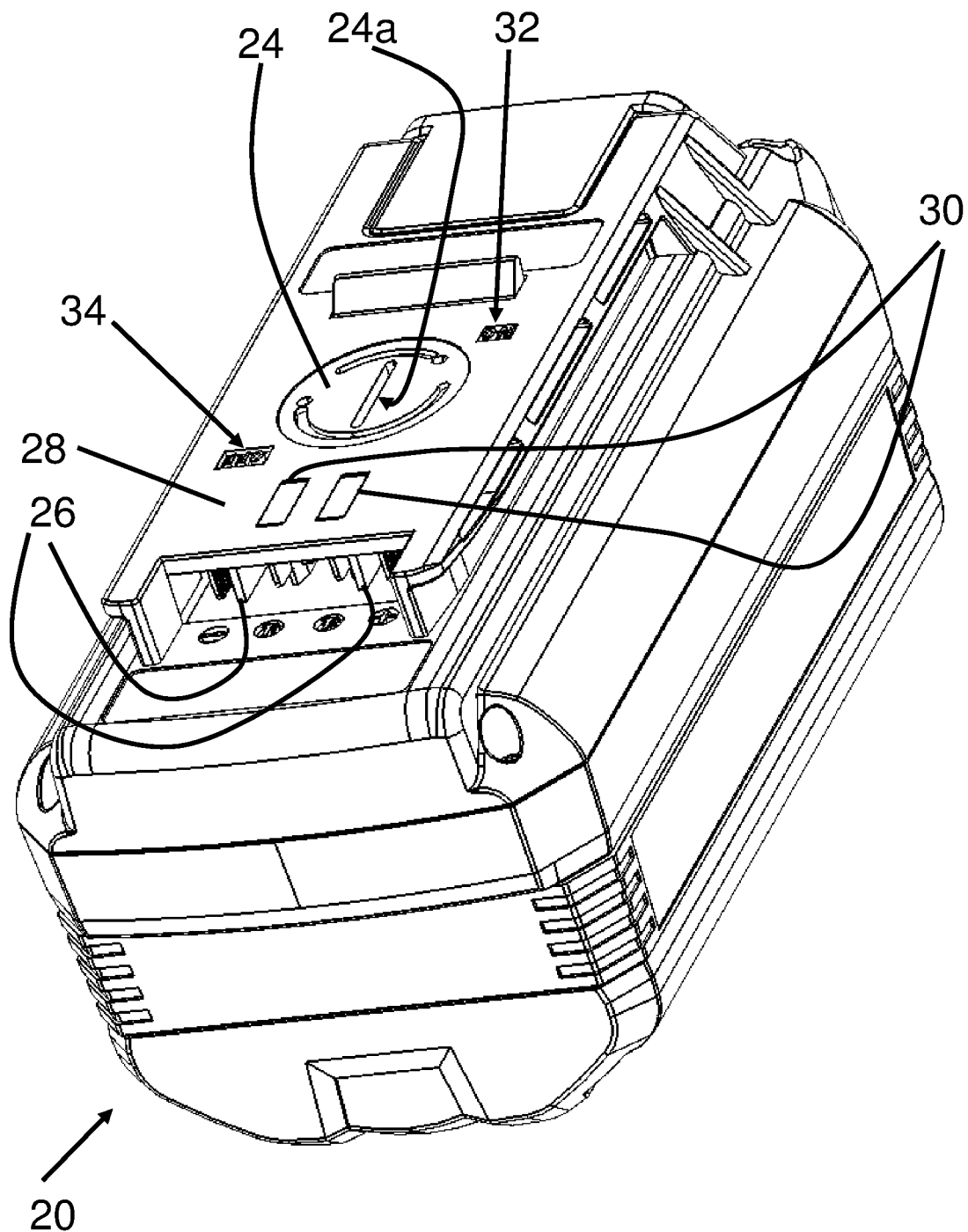
FIG. 1b is the perspective view of the battery pack in FIG. 1a from another viewing angle, where the bottom side of the battery pack is shown.

Referring now to FIGS. 1a and 1b, the first embodiment of the present invention is a battery pack 20 which can be used in electric tools for example handheld power tools and outdoor electric garden tools. The battery pack 20 contains a housing 22, which accommodates internal components (all of which are not shown in FIGS. 1a and 1b) of the battery pack 20 including a plurality of battery cells, battery frames supporting these battery cells, and a control circuit board of the battery pack. The housing 22 exhibits a special shape which is made in accordance with the dimension of a battery receptacle (not shown) on the aforementioned electric tools, as those skilled in the art would understand.

FIG. 1b shows clearly the bottom side of the battery pack 20 on which the main battery terminals 26, and the latching mechanism for fixing the battery pack 20 in the battery receptacle of the electric tool or a battery charger are located. The main battery terminals 26 are located at a level lower than the top face of a protruded part 28 of the battery housing 20, so that the main battery terminals 26 are in fact concealed in the protruded part 28 and can only be physically contacted by corresponding terminals (not shown) on the charger or the electric tool when the battery pack 20 is inserted into the battery receptacle of the electric tool or the charger. There are in addition two secondary terminals 30 formed on the top face of the protruded part 28, and thus the secondary terminals 30 are located above the main battery terminals 26. The main battery terminals 26 contain one positive power terminal as well as one negative power terminal, and also two communication terminals (not shown, which will be described in more details later). The secondary terminals 30 contain two communication terminals. The latch mechanism includes a post 34 configured on the protruded part 28 and the post 34 is movable relative to the protruded part 28. The post 34 is normally biased by a resilient means (not shown) so that the post 34 is extending beyond the surface of the protruded part 28. The post 34 therefore keeps the battery pack in the battery receptacle once it is installed, where the post 34 snap fits into a corresponding recess structure (not shown) in the battery receptacle. To remove the battery pack from the battery receptacle the user actuates a corresponding mechanism (either on the battery pack 20 itself or on the battery charger/power tool) which would urge the post 34 to move, and as a result the post 34 retreats back into the protruded part 28 and thus the battery pack is unlocked. The structure of latch mechanism and how the battery pack is securely installed to the power tool or battery charger is well-known to skilled persons in the art, and thus will not be described in details here.

On the protruded part 28, there is configured a user actuated knob 24 for configuring the internal circuit of the battery pack 20. The knob 24 is a part of a rotatable connector of the battery pack 20. Also formed on the surface of the protruded part 28 are two labels, i.e. an "ON" label 32 and an "OFF" label 34. These labels provide visual indications to the user to prompt the user rotating the knob 24 to one of the two correct positions. Such correct positions are arrived when the central indicator 24a of the knob 24 points to either the "ON" label 32 or the "OFF" label 34. Note that in the illustration of FIG. 1b, the knob 24 is not in either of the correct positions, as the central indicator 24a does not point to either the "ON" label 32 or the "OFF" label 34.

Figure 2:
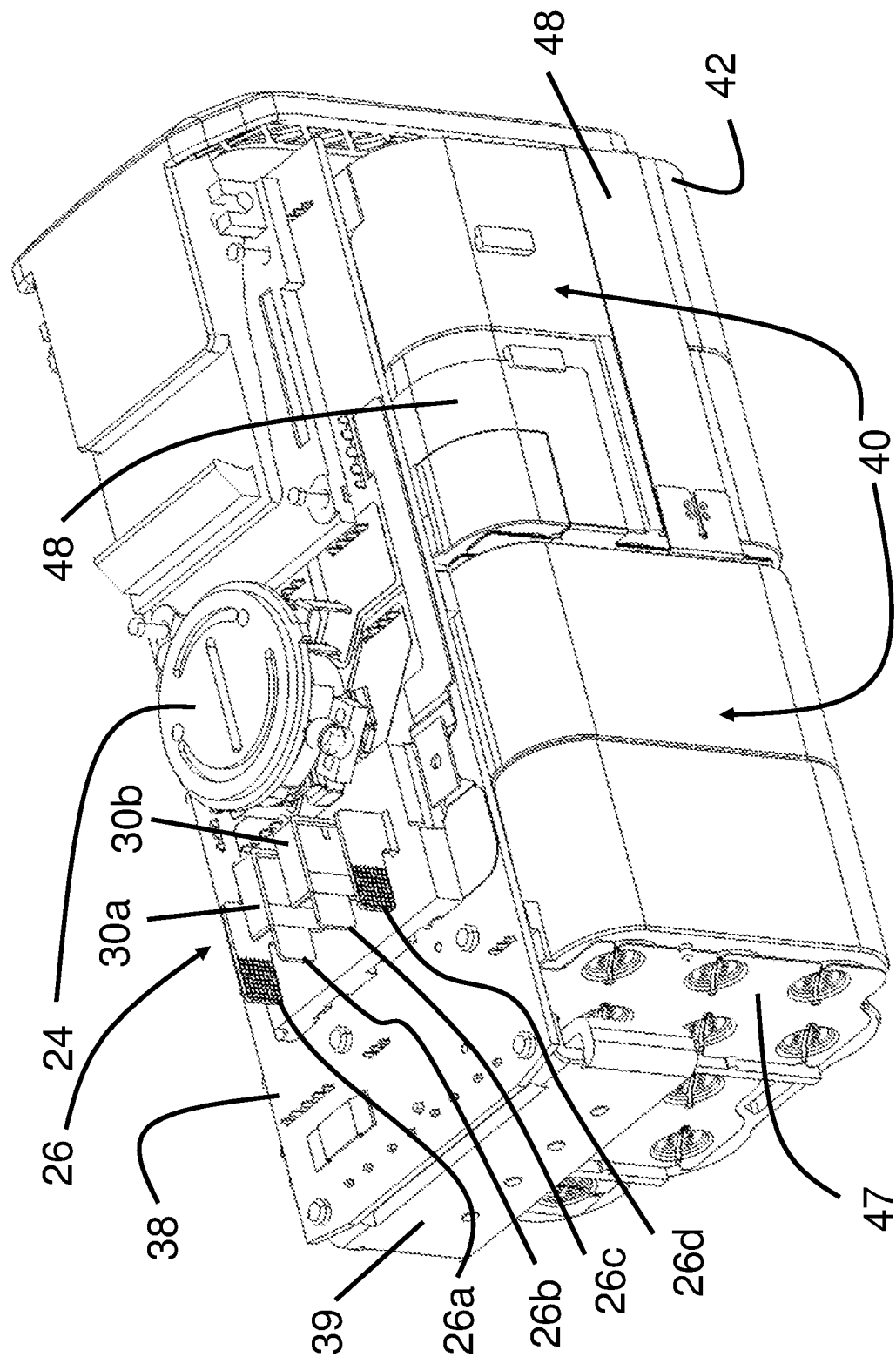
FIG. 2 shows the battery pack in FIG. 1a with the battery housing removed to expose the circuit board and the battery cells.

Referring now to FIG. 2, the battery pack described above is shown with its housing removed to reveal multiple battery frames 40 and a circuit board 38 of the battery pack. In the figure the rotatory connector including the knob 24 is also illustrated to have been installed on the circuit board 38. There are four battery frames 40 in the battery pack to which the individual battery cells 42 are installed. The four frames 40 are aligned substantially in a head-to-tail manner which together forms an elongated shape of the battery pack. Each frame 40 contains a plurality of thorough holes (not shown) where each such thorough hole is used to accommodate one battery cell 42. The battery cell 42 has a cylindrical shape. Multiple battery cells 42 in the same frame 40 are connected by metal strips 47 so as to connect the battery cells 42 in parallel. In addition, battery cells 42 across different frames 40 are connected by connecting bars 48 which extend along the exterior surface of the frames 40. The connecting bars 48 are made of thin metal strips, which have shapes closely fitting the exterior shape of the portions of frames 40 along which the connecting bar 48 extends. Each connecting bar 48 extends from an end of a frame 40 to the circuit board 38, where the battery cells 42 in different frames 40 are electrically connected to each other at the circuit board 38, subject to the status of the rotatable connector. One will see that some of the connecting bars 48 have a bent shape. There is also a heatsink 39 connected to an end of the circuit board 38.

Although not shown, the battery cells 42 in the battery pack 20 constitute different groups and sub-groups. The groups are the largest unit of battery cells in the battery pack 20 and the rotatable connector described above enables/disables the electrical connections between the groups of battery cells 42. Within each group, there is further a plurality of sub-groups, and these sub-groups each contain a plurality of battery cells 42.

The aforementioned main battery terminals 26 are installed on the circuit board 38 and are electrically connected to the circuit board 38. Four main battery terminals 26a-26d are aligned in a side-by-side manner. Terminals 26a and 26d are the positive and negative power terminals that supply electrical power to the external power tool or receive electrical power from a charger. Terminals 26c and 26b are two communication terminals for communication with the power tool or the charger. Notably, from FIG. 2 one can see that the secondary terminals 30 which include two terminals 30a and 30b are located at a position above the communicational terminals 26b and 26c among the main battery terminals 26. In particular, the communicational terminals 26b and 26c are in the conventional thin-plate shapes, but the communicational terminals 30a and 30b each have a special L shape with a bend. Each one of the communicational terminals 30a and 30b has its first portion (not shown) extending from the circuit board 38 upwardly in a way parallel to the communicational terminal 26b or 26c, but to an extent higher than the communicational terminal 26b or 26c from the circuit board 38. The second portion of each one of the communicational terminals 30a and 30b after the bend then protrudes forwardly as same as the communicational terminal 26b or 26c, but is above the communicational terminal 26b or 26c. In this way, within a limited space two different communication terminals can be implemented in a tight manner, and they are in good electrical isolation, as there is certain isolating material (not shown) between the first portion of the communicational terminals 30a or 30b and the respective one of the communicational terminal 26b or 26c.

Figure 3:
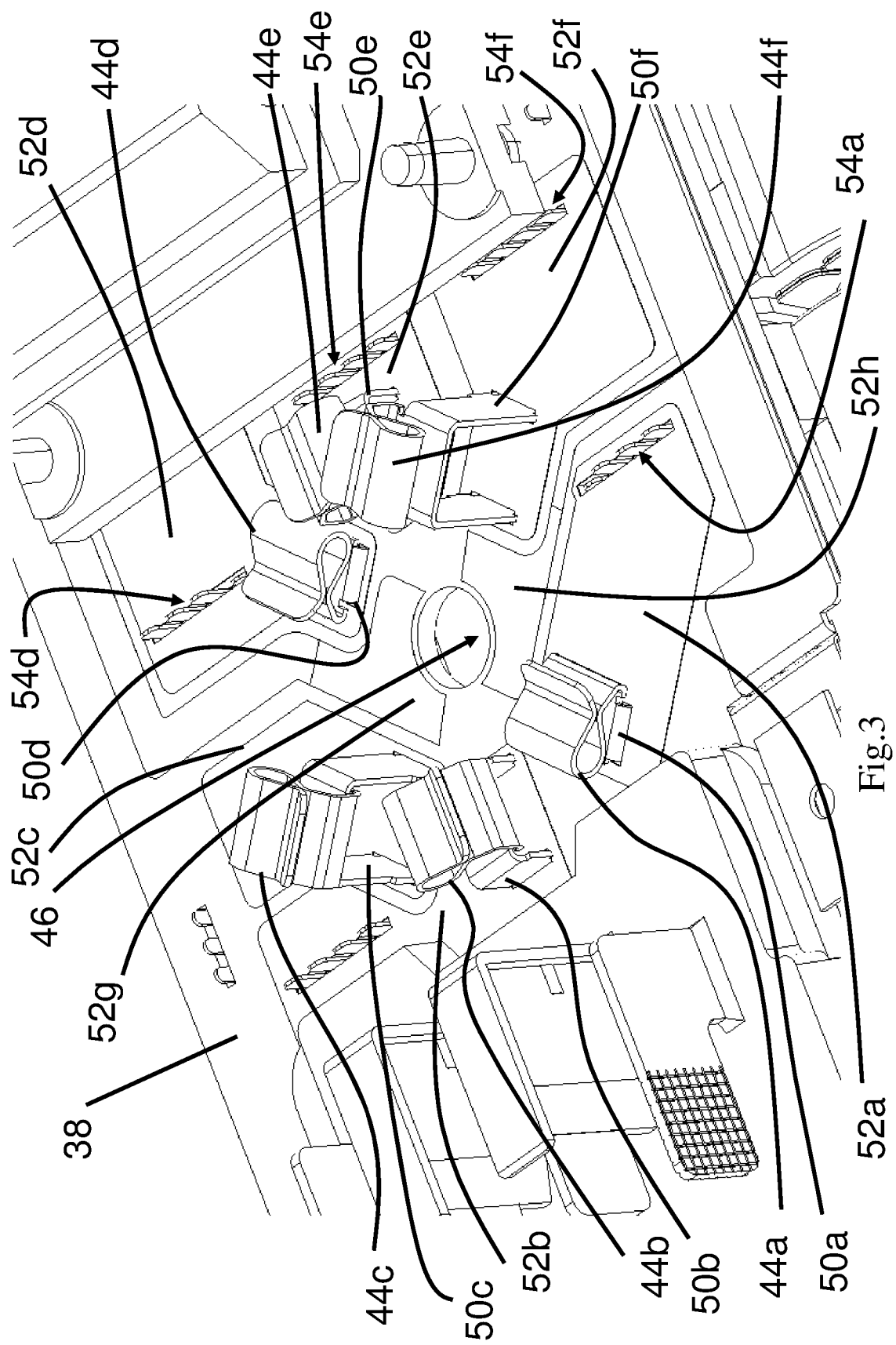
FIG. 3 shows a perspective view of the circuit board in partial, with the rotary connector hidden to show the on-board terminals on the circuit board.

FIG. 3 shows the on-board terminals on the circuit board 38 which are adapted to connect to respective connecting terminals of the rotatable connector. However, for the clarity of illustration the rotatable connector is not shown in this figure. FIG. 3 shows that six on-board terminals 44a-44f are configured on the circuit board 38 in a circumferential fashion, and a mount hole 46 is formed on the circuit board 38 at the center of the hypothetic circle formed by the six on-board terminals 44a-44f. The mount hole 46 is adapted to receive and secure a part of the rotatable connector. The six on-board terminals 44a-44f are configured at different heights as they are support by supporting members 50a-50f of different lengths. In particular, terminals 44a and 44d are the lower terminals among the six and they are arranged on opposite sides of the mount hole 46, as they are located on a straight line which passes through the mount hole 46. Terminals 44b and 44e are the middle terminals among the six and these two terminals are also arranged on opposite sides of the mount hole 46. Terminals 44c and 44f are the higher terminals among the six and these two terminals are also arranged on opposite sides of the mount hole 46. Thus, the six on-board terminals form three pairs, i.e. terminals 44a and 44d, terminals 44b and 44e, and terminals 44c and 44f. Starting from terminal 44a to 44f, their heights follow the sequence of "low-middle-high-low-middle-high". This is because their respective supporting members 50a-50f are also having a similar pattern in terms of variation of heights. Each one of the supporting members 50a-50f has a bridge-like structure, and each one of the on-board terminals 44a-44f is a duck-bill shaped terminal. The on-board terminals 44a-44f are arranged to be at different height so that they will not interfere with each other during the actuation of the rotatable connector.

Each one of the supporting members 50a-50f is mounted to a respective trace 52a-52f, through which the on-board terminals 44a-44f are connected to respective groups of battery cells. Both the supporting members 50a-50f and the on-board terminals 44a-44f are made of metals in order to be conductive. Each one of the traces 52a-52f also contains a slit 54a-54f through which the above-mentioned connecting bars (not shown in FIG. 3) can be inserted and be used to connect ultimately to the groups of battery cells.

Figure 4:
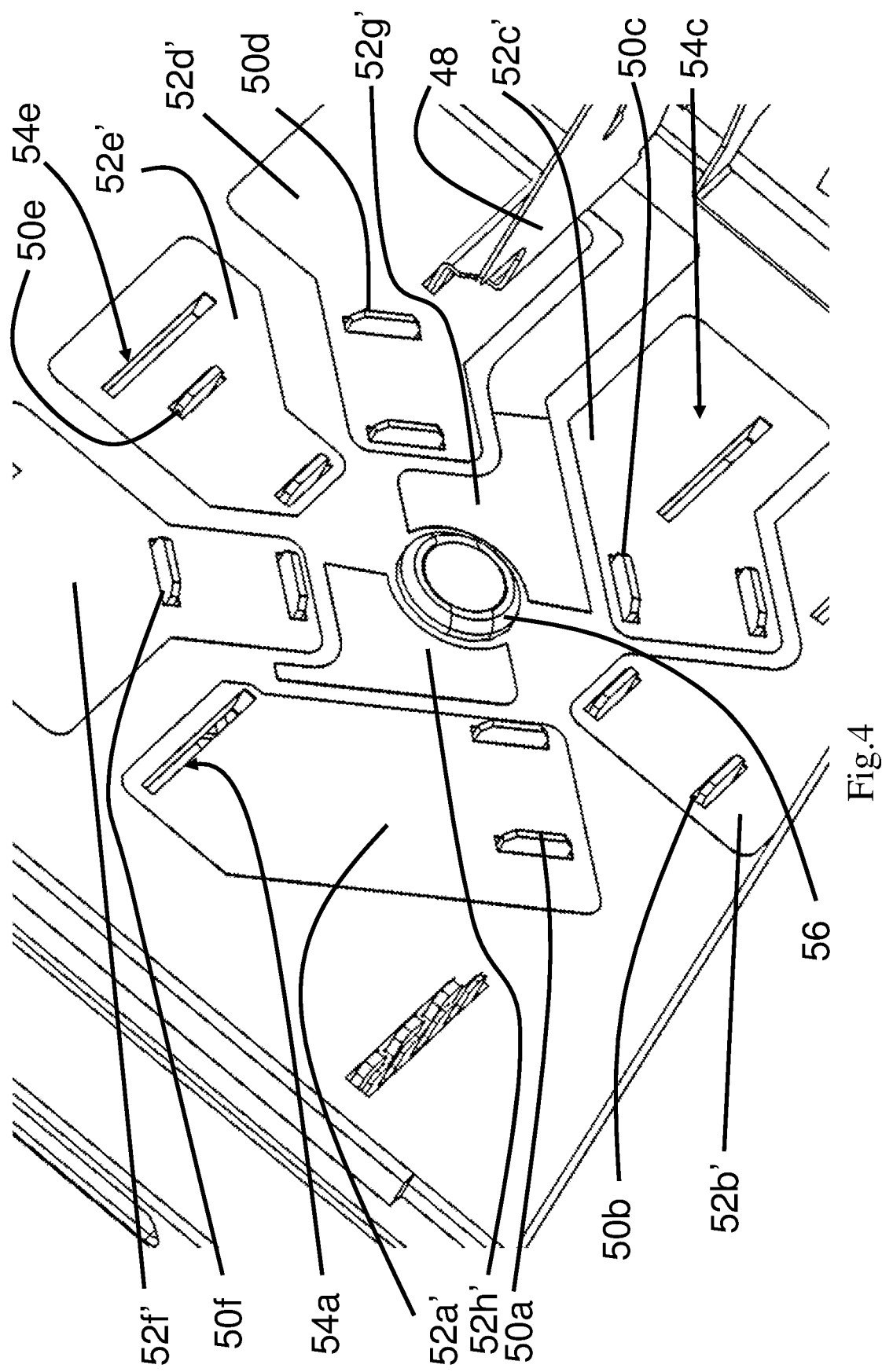
FIG. 4 shows the back side of the circuit board in partial, where the rotary connector is shown to be connected to the circuit board.

Turning now to FIG. 4. The back side of the circuit board 38 have six traces 52a'-52f', which correspond to the above-mentioned traces 52a-52f on the top side of the circuit board 38 in a one-to-one manner. The six traces 52a'-52f' on the back side can be seen as "mirrored" ones of those on the top side of the circuit board 38. The six traces 52a'-52f' are each connected with its counterpart among traces 52a-52f once a supporting member or a connecting strip is inserted into the circuit board 38. For example, FIG. 4 shows a connecting strip 48 inserted into a slit (not shown) on the trace 52d'. FIG. 4 also shows a rotating base 56 of the rotatable connector received and positioned in the mounting hole on the circuit board 38.

As also shown in FIGS. 3 and 4, there is further a pair of traces 52g, 52h on the top side of the circuit board 38, and correspondingly a pair of traces 52g', 52h'' on the back side of the circuit board 38. The traces 52g, 52h are adapted to be contacted by a connecting part of the rotatable connector, as will be described in more details below.

Figure 5:
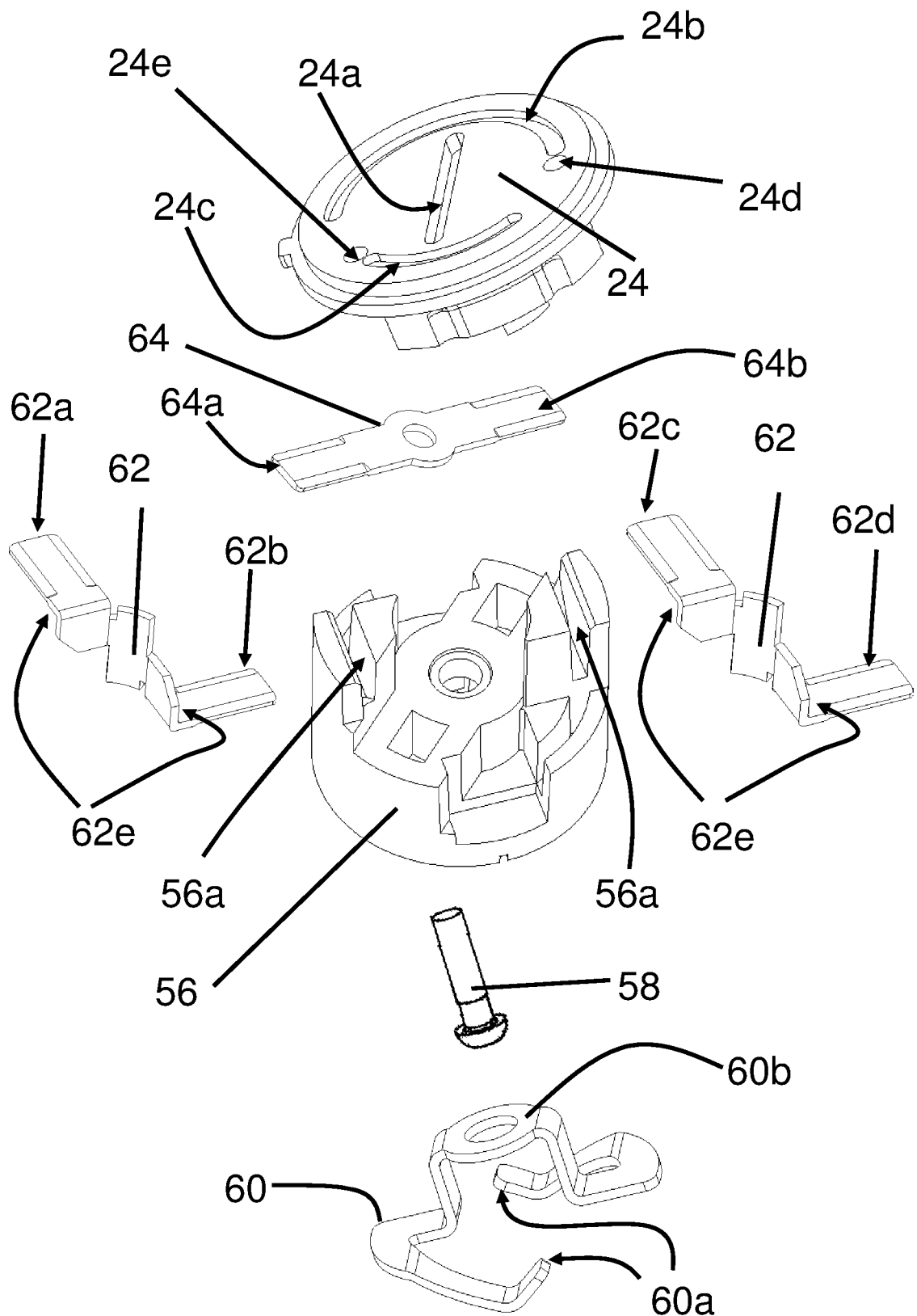
Figure 6:
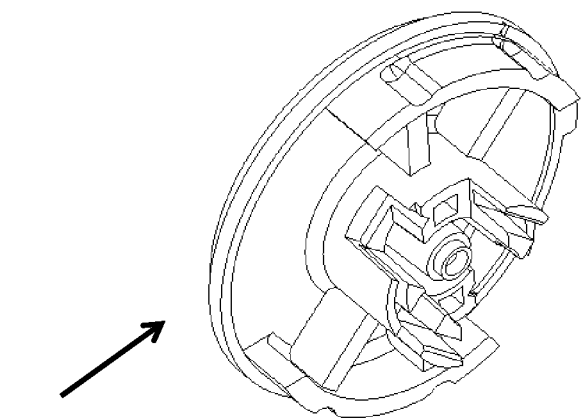
FIG. 6 shows the user actuated knob in FIG. 5 from another viewing angle.
Figure 7A:
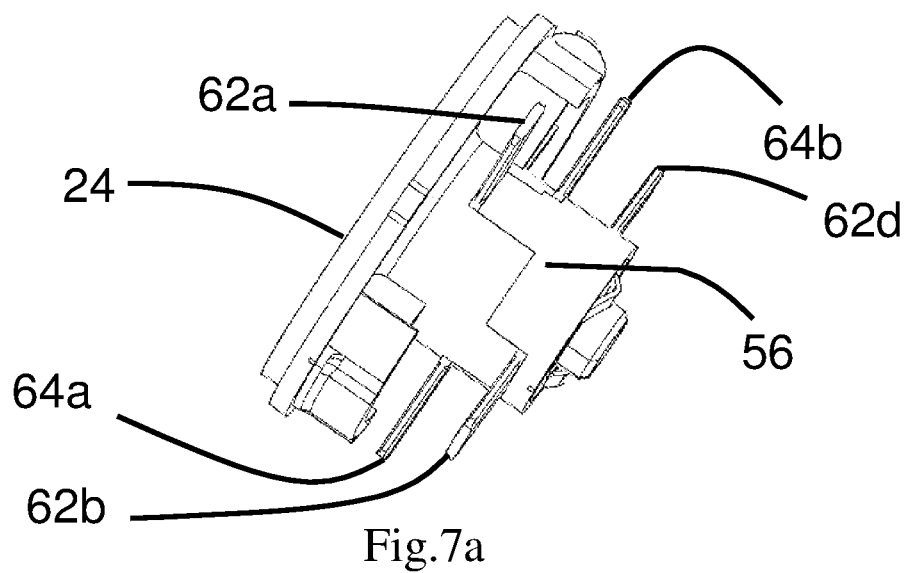
FIG. 7a shows independently the assembled rotary connector in the battery pack of FIG. 1a from its side.
Figure 7B:
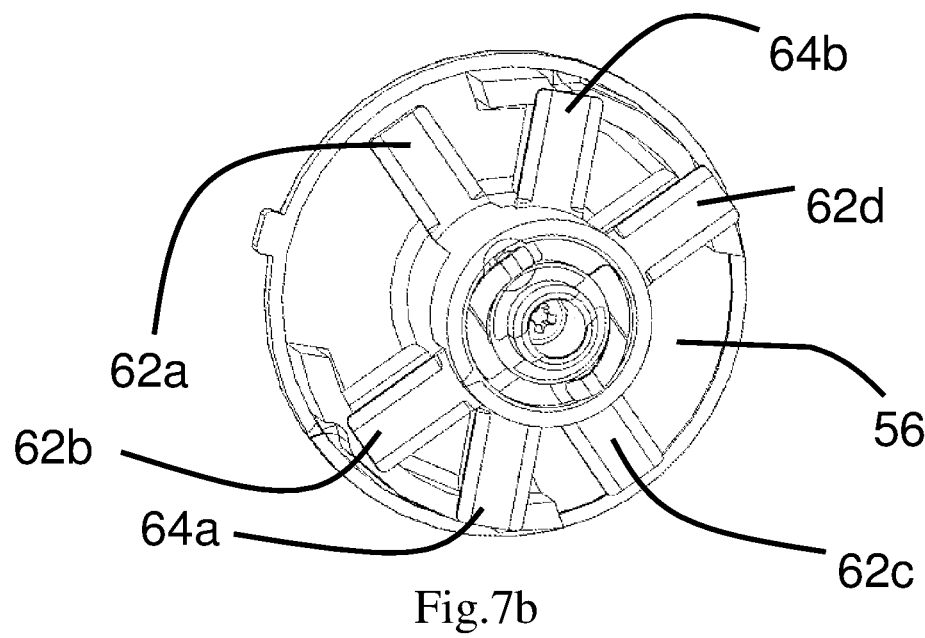
FIG. 7b shows the assembled rotary connector in FIG. 7a from its bottom.

Next, in FIGS. 5-7b the rotatable connector of the battery pack is shown, which contains the knob 24, the rotating base 56 that is fixed to and co-rotatable with the knob 24, and various connecting terminals. The components shown in FIG. 5 are not illustrated with their correct dimensions relative to each other or their correct orientations when assembled. There are three pairs of connecting terminals, with each pair formed by a single piece of component. The three pairs of connecting terminals are coupled on the rotating base 56 and are rotatable as a result of the rotating base 56 rotating. In particular, a first pair of connecting terminals 64a, 64b is formed on two opposite ends of an elongated connecting strip 64. The second pair of connecting terminals 62a, 62b, and the third pair of connecting terminals 62c and 62d, are formed respectively on two connecting members 62. The two connecting members 62 are identical to each other, and each one of them contains two bends 62e. The existence of the bends resulting in that on one connecting member 62, the connecting terminal 62a is not only separated from the other connecting terminal 62b at an angle of 90° in the radial plane, but also the connecting terminal 62a is offset from the connecting terminal 62b along the direction of the rotating axis (not shown) of the rotatable connector. The two connecting terminals 62c and 62d on the other connecting member 62 have similar spatial relationship between each other. A screw 58 fastens the knob 24, the connecting strip 64, the rotating base 56, and a tail connector 60 together. The tail connector 60 has two tail ends 60a connected by a middle part 60b, where the middle part 60b is fastened to the rotating base 56 by the screw 58. The two tail ends 60a are arranged so that they face each other but are offset from each other along the axis direction. The two tail ends 60a are adapted to contact with the traces 52g and 52h. In addition, the two connecting members 62 are mounted on the rotating base 56 by being received and fastened by various grooves 56a form on the rotating base 56.

As best seen in FIG. 5, on the top side (which is the side visible to the user when the battery pack is assembled) of the knob 24, besides the central indicator 24a which is formed as a groove, there are also two arc-shaped grooves 24b, 24c in different lengths, and two marks 24d, 24e each on an end of the two arc-shaped grooves 24b, 24c. All of the central indicator 24a and the two arc-shaped grooves 24b, 24c are designed to facilitate the user operating the knob 24 for example using his/her nails, but at the same time prevents accidental actuation to the knob 24. The two marks 24d, 24e may help indicating the direction of rotation if the user wants to turn on/turn off the internal circuit of the battery pack.

Figure 8:
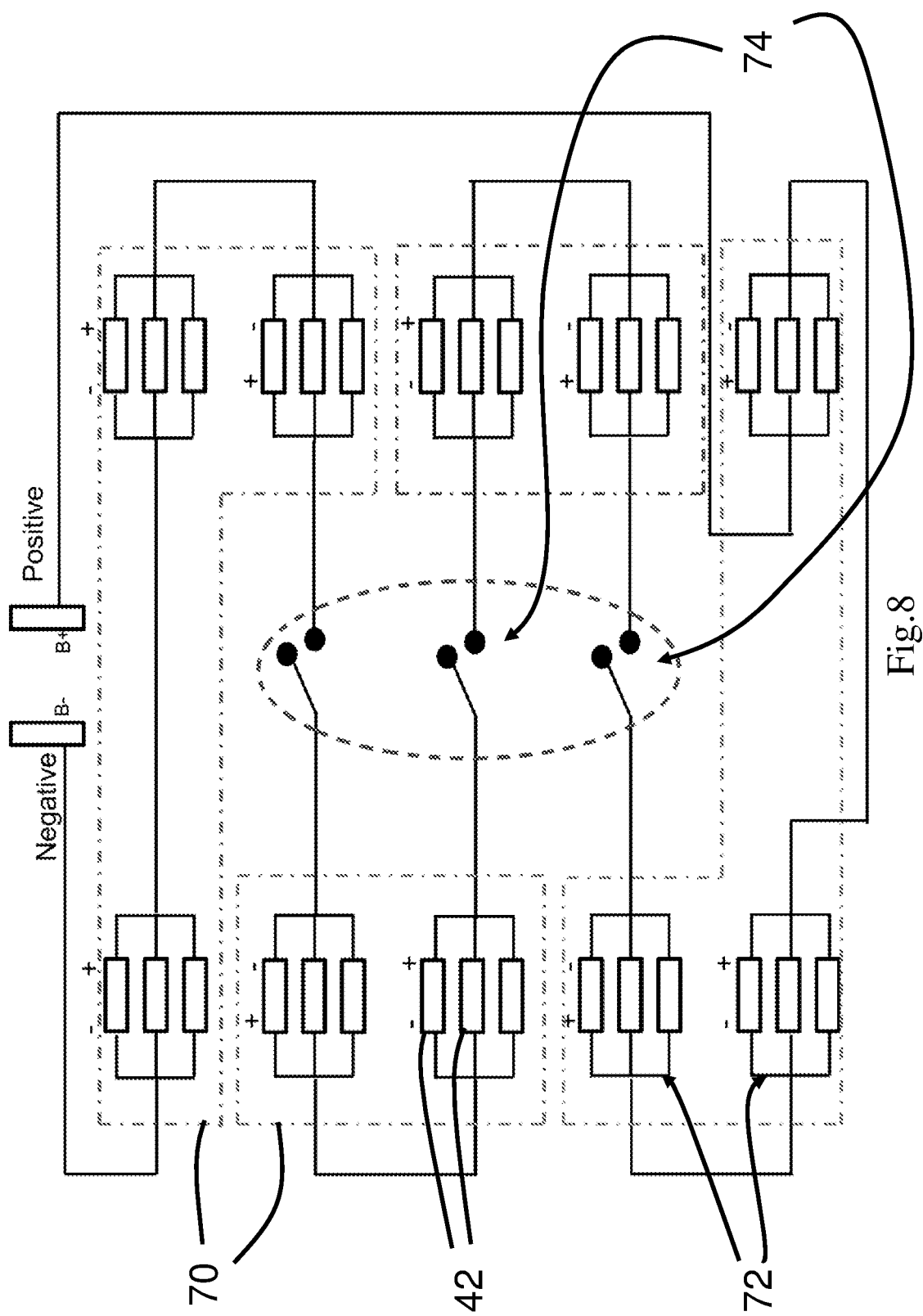

As will be explained below, the rotatable connector can be switched between a first status and a second status, which ultimately control electrical connections between the groups of battery cells in the battery pack. The first status and second status correspond to two rotational positions respectively. In the first rotational position the rotatable connector is switched on, thereby enabling the electrical connections between the groups of battery cells, and in the second rotational position the rotatable connector is switched off, thereby disabling the electrical connections between the groups of battery cells. The simplified schematic diagram in FIG. 8 shows how four groups 70 of batteries in the battery pack of FIG. 1a-7b can be electrically connected with the rotatable connector. Each group 70 contains a plurality of sub-groups 72 connected in series, either in the number of two or three. Then, in each sub-group 72 there are three individual battery cells 42 connected in parallel. In such a configuration, each sub-group 72 outputs the same voltage as a single battery cell 42. However, the total voltage outputted by the battery pack will be ten times the voltage outputted by a single sub-group 72, as one can see from FIG. 9 that there are in total ten sub-groups 72 connected in series if the three "switches" 74 are closed. The switches 74 are actually formed by the connecting terminals of the rotatable connector, as well as their respective on-board terminals on the circuit board.

Figure 9A:
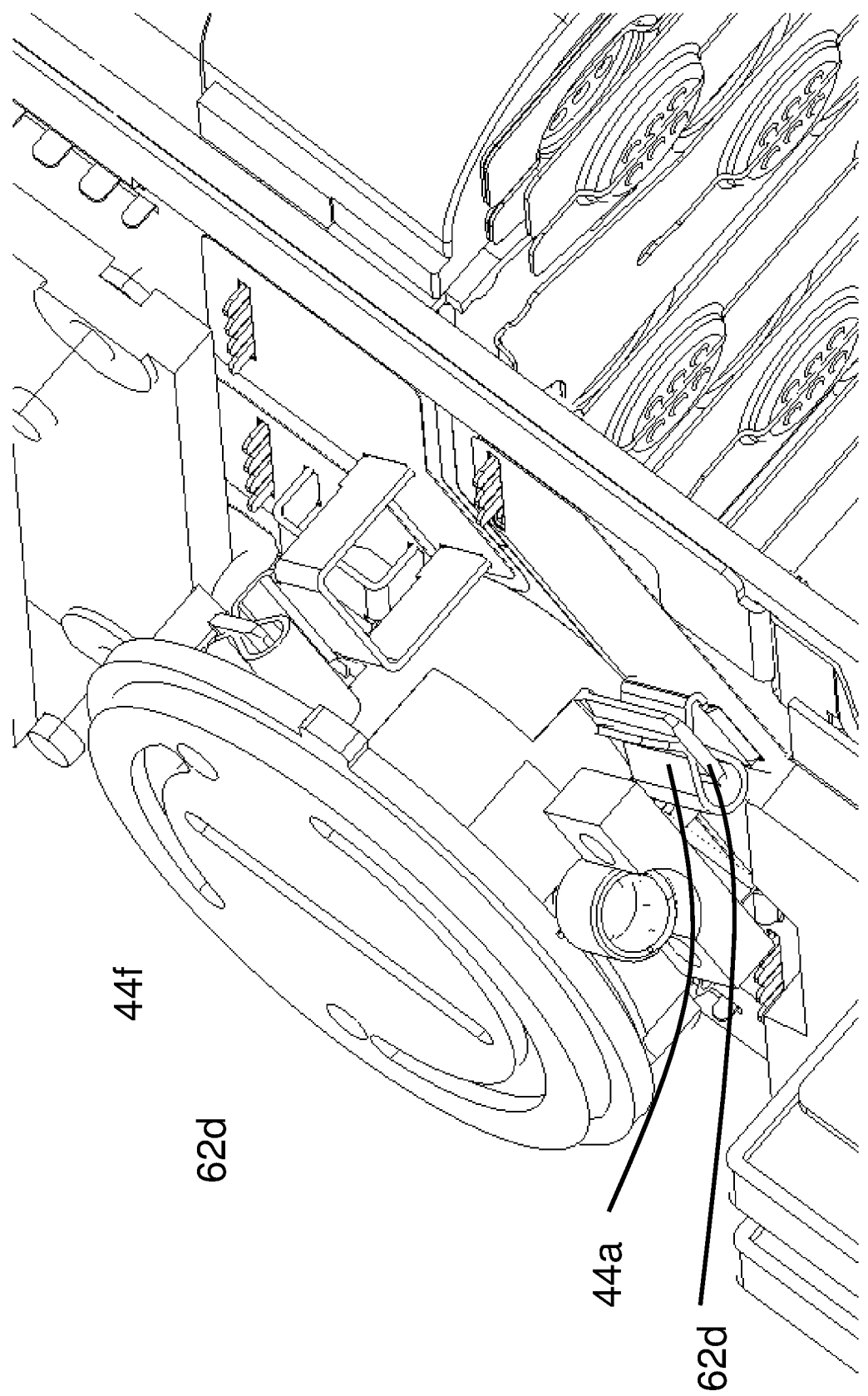
FIG. 9a is a perspective view of the battery pack of FIG. 1a showing the rotary connector in its ON position.
Figure 9B:
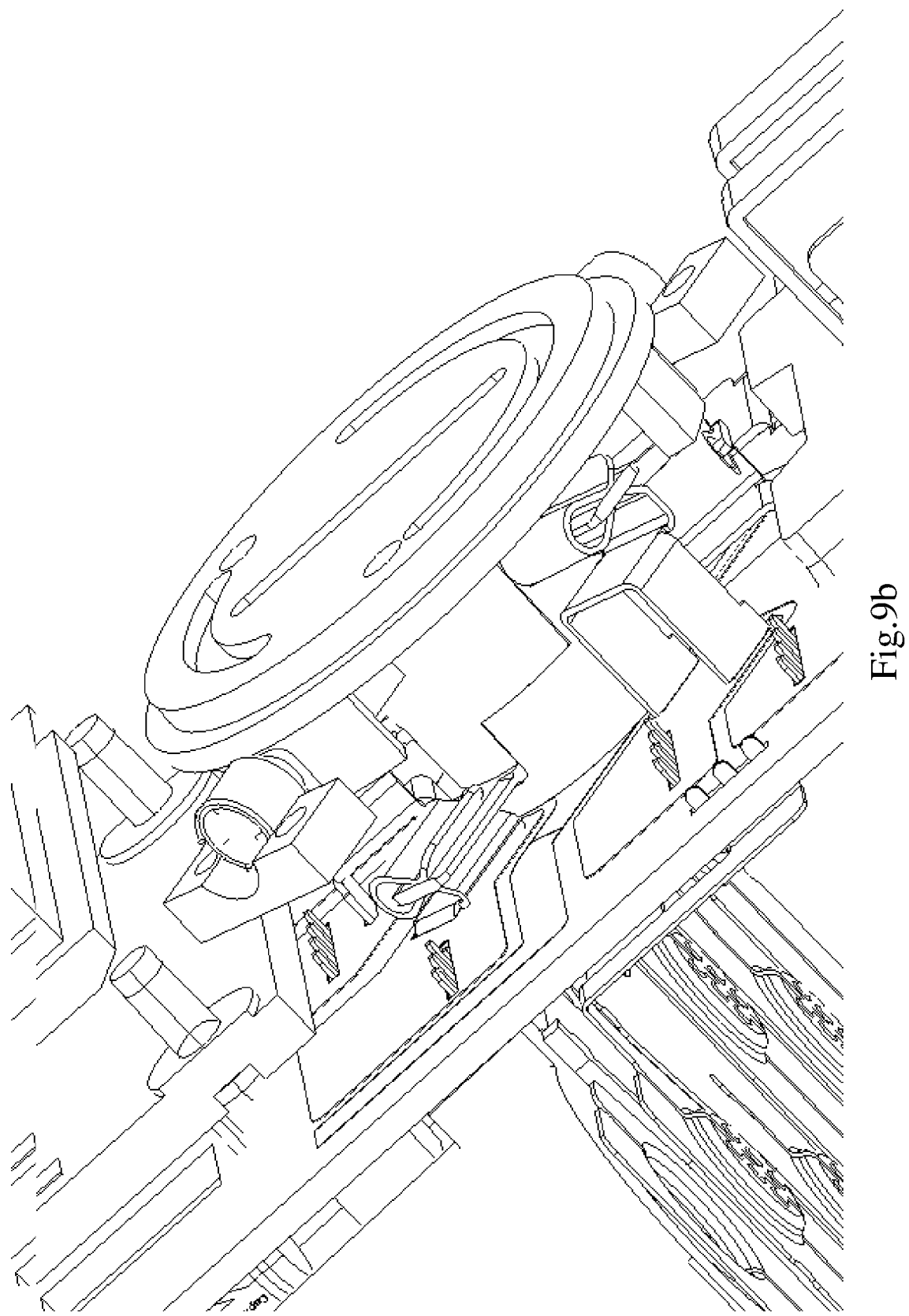
FIG. 9b shows the rotary connector in its status of FIG. 9a from another viewing angle.

In the status as shown in FIG. 9, all the four groups 70 are not connected with each other, as the three pairs of terminals on the rotatable connector are not in contact with their respective on-board terminals. This is shown as three switches 74 being opened in FIG. 9. When the end user purchased or otherwise received the battery pack, he/she only has to perform a simple setup process to make the battery pack operational. In particular, the user only needs to rotate the rotatable connector of the battery pack to the "ON" position, and such action would place the connecting terminals in the rotatable connector into the on-board terminals, thus enabling the electrical connection between the groups of battery cells. In this rotation, the connecting terminals change from their non-conductive positions to their conductive positions. This is equivalent to the closing of three switches 74 in FIG. 9. Then, the electrical circuit in the battery pack is completely closed and the battery pack is ready to use.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

It is to be understood that, if any prior art publication is referred to herein, such reference does not constitute an admission that the publication forms a part of the common general knowledge in the art, in Australia or any other country.

For example, the battery cells in the battery pack as described in FIGS. 1-9b above are accommodated in thorough holes in the battery frames. However, it is clear that other structures and mechanisms may also be used according to the user's preference to install and fix the battery cells, including but not limited to non-encircling battery racks, heat shrink tubing, etc.

In addition, the battery pack internal circuit is exemplified in FIG. 8 as ten sub-groups of battery cells connected in series. In each sub-group the three battery cells are connected in parallel. Those skilled in the art should realize that the battery connections in battery packs according to the present invention are not limited to as such. The battery cells can be configured in parallel, in serial, or in hybrid to form a battery set, and the battery sets can also be configured in parallel, in serial, or in hybrid.

In the examples shown in FIGS. 1-9b and 11, there are three switches (i.e. three pairs of connecting terminals) provided in the internal electrical circuit of the battery pack, which are used as circuit breakers at certain points between the four groups of battery cells. However, it should be understood that any number of the pairs of connecting terminals can be used in the battery pack as long as they serve the purpose of interrupting the electrical circuit in the battery pack unless terminal connectors are rotated to a position so that they complete the electrical circuit.

In addition, in the embodiments described above, the two connecting terminals on a connecting member with bends in the rotatable connector are offset from each other by 90° in the plane of rotation. However, skilled persons should realize that the angle does not have to be a right angle. Rather, depending on the design requirement, the connecting terminals can be arranged such that they are separated from each other at an angle of $\alpha$, wherein $\alpha$ satisfying $0°<\alpha<180°$.

The invention claimed is:

1. A battery pack comprising:
   a frame;
   two or more battery cells installed to the frame; and
   a rotatable connector configured to enable electrical connections between the two or more battery cells, wherein the rotatable connector comprises:
   a rotatable knob; and
   a connecting terminal,
   wherein rotation of the rotatable knob rotates the connecting terminal between at least a first rotational position in which the connecting terminal is in a conducting position contacting an on-board terminal of the battery pack to electrically connect each battery cell of the two or more battery cells, and a second rotational position in which the connecting terminal is in a non-conducting position spaced apart from the on-board terminal of the battery pack such that at least two battery cells of the two or more battery cells are not electrically connected to one another by a conductive material.

2. The battery pack of claim 1, wherein the rotatable connector comprises a pair of connecting terminals which are formed on two ends of an elongated connecting strip.

3. The battery pack of claim 1, wherein the rotatable connector comprises a pair of connecting terminals which are formed on two ends of a connecting member; the two connecting terminals arranged such that they are separated from each other at an angle of $\alpha$, wherein $\alpha$ satisfying $0°<\alpha<180°$.

4. The battery pack of claim 3, wherein $\alpha$ is 90°.

5. The battery pack of claim 3, wherein the rotatable knob is configured to rotate about a rotation axis, further wherein the pair of connecting terminals are offset from each other along an axial direction of the knob.

6. The battery pack of claim 3, wherein each said group of battery cells comprises two sub-groups connected in series, and each said sub-group comprises a plurality of battery cells connected in parallel.

7. The battery pack of claim 1, wherein the rotatable connector comprises three pairs of connecting terminals; the battery pack further comprising four groups of battery cells, the electrical connections between which controlled by the three pairs of connecting terminals.

8. The battery pack of claim 1, further comprising a plurality of groups of battery cells; each said group comprising two or more battery cells; wherein the rotatable connector is configured to enable electrical connections between the plurality of groups of battery cells.

9. The battery pack of claim 1, further comprising a circuit board to which the rotatable connector is rotatably installed; the circuit board comprising one or more duck-billed terminal which is adapted to cooperate with the rotatable connector.

10. A battery pack comprising:
    a frame;
    three battery cells installed to the frame; and
    a rotatable connector interconnecting the three battery cells and configured to selectively enable electrical connections between each of the three battery cells, wherein the rotatable connector comprises:
    a rotatable knob; and
    a connecting terminal,
    wherein rotation of the rotatable knob is configured to rotate the connecting terminal between a first rotational position in which each battery cell of the three battery cells is electrically connected together via conduction through the connecting terminal, and a second rotational position in which at least two battery cells of the three battery cells are not electrically connected to one another by a conductive material.

11. The battery pack of claim 10, wherein the rotatable knob comprises an externally exposed face with a first arc-shaped groove and a second arc-shaped groove having different lengths as compared to one another.

12. The battery pack of claim 10, wherein an outer surface of the rotatable knob is visible from an external area of the battery pack, and wherein the outer surface of the knob is generally flush with a surface of the battery pack.

13. The battery pack of claim 10, wherein the battery pack comprises a protruded part, and wherein the rotatable knob is disposed adjacent to the protruded part.

14. The battery pack of claim 10, wherein all of the three battery cells are not electrically connected to one another when the rotatable knob is in the second rotational position.

15. The battery pack of claim 10, wherein the rotatable knob comprises a rotating base that is fixed to and co-rotates with the rotatable knob, and wherein the connecting terminal is coupled to the rotating base and rotates as a result of the rotating base rotating.

16. A battery pack comprising:
    a frame;
    a plurality of battery cells installed to the frame; and
    a rotatable connector interconnecting the plurality of battery cells and configured to selectively enable electrical connections between each of the plurality of battery cells, wherein the rotatable connector comprises:
    a rotatable knob;
    a rotating base fixed to a co-rotating with the rotatable knob; and
    a connecting terminal coupled to the rotating base,
    wherein rotation of the rotatable knob is configured to rotate the connecting terminal between a first rotational position in which each battery cell of the plurality of battery cells is electrically connected together via conduction through the connecting terminal, and a second rotational position in which at least three battery cells of the plurality of battery cells are not electrically connected to one another through the connecting terminal by a conductive material.

17. The battery pack of claim 16, wherein the rotating base is coupled to the rotatable knob by a screw.

18. The battery pack of claim 16, wherein the rotatable knob comprises an externally exposed face with a first arc-shaped groove and a second arc-shaped groove having different lengths as compared to one another.

19. The battery pack of claim 16, further comprising a circuit board to which the rotatable connector is rotatably installed; the circuit board comprising one or more duck-billed terminal which is adapted to cooperate with the rotatable connector.

20. The battery pack of claim 16, wherein the rotatable connector comprises a pair of connecting terminals which are formed on two ends of an elongated connecting strip.

* * * * *